March 27, 1928.
A. CORNELL
CUTTING TOOL
Filed March 7, 1927
1,663,935
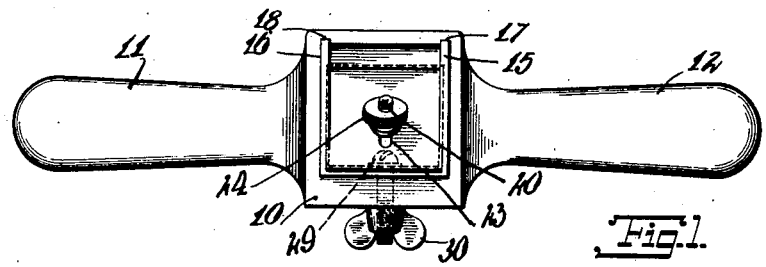
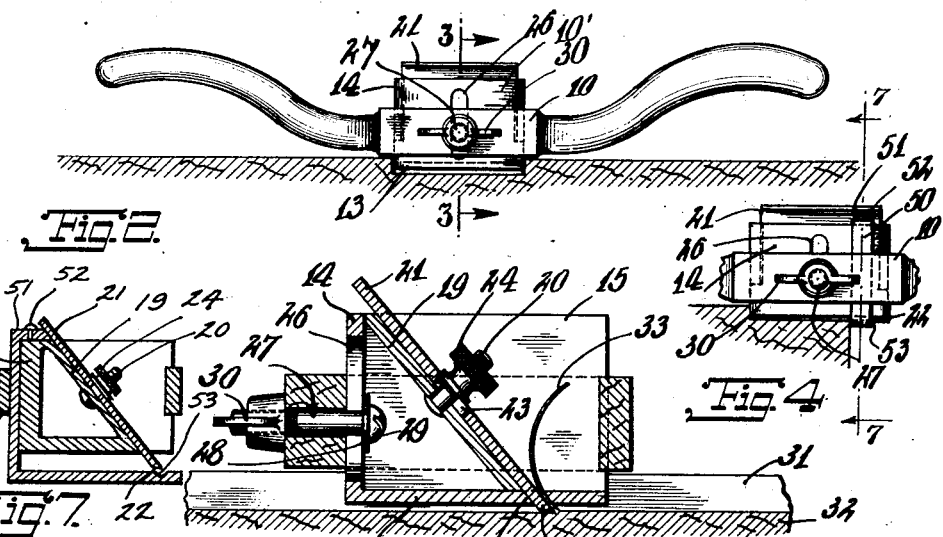
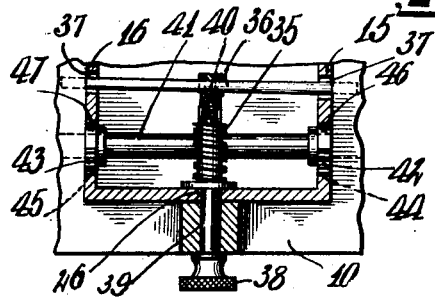
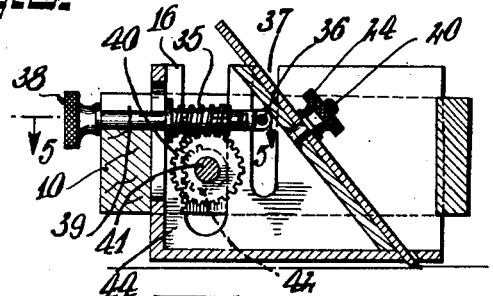
INVENTOR
Anton Cornell
BY
ATTORNEY Patented Mar. 27, 1928.

1,663,935

UNITED STATES PATENT OFFICE.

ANTON CORNELL, OF NEW YORK, N. Y.

CUTTING TOOL.

Application filed March 7, 1927. Serial No. 173,270.

This invention relates to a new and useful device in the nature of a cutting tool, particularly adapted for cutting grooves in wood.

The object of the invention is to provide a cutting tool of novel construction and arrangement of parts, hereinafter more fully described, claimed and illustrated in the accompanying drawing.

Fig. 1 is a top plan view of my improved cutting tool.

Fig. 2 is a rear elevational view thereof.

Fig. 3 is an enlarged tranverse sectional view, taken on the line 3—3 of Fig. 2.

Fig. 4 is a fragmentary rear elevational view illustrating the gauging member as applied to my improved device.

Fig. 5 is a fragmentary sectional view taken on the line 5—5 of Fig. 6.

Fig. 6 is a similar view to that shown in Fig. 3 illustrating a modification of my improved device.

Fig. 7 is a sectional view taken on the line 7—7 of Fig. 4.

As here embodied my improved cutting tool comprises a body member 10, having handle elements 11 and 12, extended therefrom, horizontally, in opposite directions. The body member 10, is provided with an opening, adapted to slidably receive the planer holder which is of box like construction. The planer holder comprises a base member 13, a rear member 14 and side members 15 and 16. The above mentioned opening provided in the body member 10, having notched portions 17 and 18, is adapted to receive the extremities of the side members 15 and 16, respectively. The planer holder, is provided with a planer holder proper 19, positioned at an angle therein, or inclined, and provided with an aperture intermediate thereto, adapted to receive the threaded member 20. The planer proper 21, is of common construction, and is provided with a cutting edge 22. The planer proper 21, is provided with an elongated aperture 23, adapted to receive the threaded member 20. The thumb screw 24, is threadedly attached to the threaded member 20, as a means of removably securing the planer proper 21, to the holder proper 19 of the above mentioned planer holder. The cutting edge 22 of the planer proper 21 is extended through the elongated slot 25, formed in the above mentioned base member 13 of the planer holder. The rear member 14 of the planer holder, is provided with an elongated aperture 26, adapted to receive the threaded member 27, which is secured thereto by a collar 28, positioned under the enlarged head 29 of the threaded member 27. The rear portion of the body member 10, is provided with an aperture adapted to receive the threaded member 27. The wing nut 30, is threadedly attached to the threaded member 27, as a means of adjustably securing the said planer holder to the body member 10.

The above described construction is such as will permit the above mentioned planer holder to be lowered, relative to the body member 10, so as to permit the cutting edge 22 of the planer proper 21, to cut a groove, designated, by the reference numeral 31, in a piece of wood 32, when my improved cutting tool is forced or pulled over the surface of the piece of wood 30, by the operator gripping the handle elements 11 and 12. It is obvious that the wood will be removed in chips or shavings, as clearly designated by the reference numeral 33, and that the depth of the groove cut, may be predetermined by setting the said planer holder the desired distance below the body member 10. Graduations 10' may be placed on one edge of the planer holder, so as to permit the planer holder to be set thereto, as a means of predetermining the depth of the groove cut.

In Fig. 4 of the accompanying drawing, I have shown a gauging member 50 of U shaped construction, adapted to engage over the above mentioned planer holder. The gauging member 50, is provided with an upper inwardly extended portion 51, adapted to engage over the rear side 14 of the planer holder. The gauging member 50, is removably attached to the planer holder by the threaded member 52, a screw or the like, adapted to engage the upper portion of the rear side 14 of the said planer holder. The gauging member 50, is provided with a groove 53, adapted to receive a portion of the cutting edge 22, of the planer proper 21. The above described construction is such as will permit the gauging member 50, to be attached to either side of the planer holder, so as to gauge or predetermine the width of the groove cut by my improved device, as clearly shown in Fig. 4.

In Figs. 5 and 6 of the accompanying drawing, I have shown the worm member 35, pivotally attached, as at 36, by a pin or the like, to the body member 10, and extended through elongated apertures 37, formed in the above mentioned side members 15 and 16, of the planer holder. The worm member 35, is provided with an enlarged outer extremity 38, or head, adapted to engage in the elongated aperture 39 formed in the rear portion of the body member 10, so as to permit the worm member 35, to engage with the worm wheel 40, attached to the shaft 41 carried by the body member 10. The segment gears 42 and 43, are attached to the shaft 41, and are adapted to engage the teeth 44 and 45, respectively, formed in the side members 15 and 16, respectively adjacent to elongated openings, 46 and 47, formed therein. The above described construction is such as will permit the above mentioned tool holder to be more readily and accurately adjusted, and which will permit the tool holder to be more easily removed from the body member 10.

Having thus described my invention what I claim as new and desire to protect by Letters Patent of the United States is as follows:

In a cutting tool of the class described, a frame comprising spaced handles, a plane body slidably mounted in said frame comprising a smooth base portion adapted to engage the surface being worked upon, a bit slidably mounted in said plane body having a cutting edge thereon disposed through a slot in the base portion of said plane body, a pin disposed through elongated slots in said plane body and mounted at its ends in the sides of said frame, a shaft disposed through elongated slots in said plane body and journaled at its extremities on the sides of said frame, a shaft pivotally connected at its inner end to said pin and rotatively journaled intermediate its ends in said frame, a worm on said shaft, a worm gear on said first mentioned shaft meshed with the worm of said second mentioned shaft, teeth formed on the edge of the slot of said plane body through which said first mentioned shaft is disposed, gear segments rigidly mounted on said first mentioned shaft in mesh with the teeth of said edge portion, and a thumb knob on the external end of said second mentioned shaft adapted to be manipulated for driving said gear segments to raise and lower said plane body for adjustably positioning the base portion thereof in close proximity to the surface being worked.

In testimony whereof I have affixed my signature.

ANTON CORNELL.